US012726347B2

(12) United States Patent
Balin et al.

(10) Patent No.: US 12,726,347 B2
(45) Date of Patent: Sep. 1, 2026

(54) SECURE COMMUNICATION IN EDGE CLUSTERS USING AUDIO COMMUNICATIONS

(71) Applicant: Dell Products L.P., Round Rock, TX (US)

(72) Inventors: Maxim Balin, Gan-Yavne (IL); Efi Levi, Beer Sheva (IL); Lior Benisty, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 264 days.

(21) Appl. No.: 18/491,190

(22) Filed: Oct. 20, 2023

(65) Prior Publication Data

US 2025/0132908 A1 Apr. 24, 2025

(51) Int. Cl.

| | |
|---|---|
| ***H04L 9/08*** | (2006.01) |
| ***G10L 19/02*** | (2013.01) |
| ***G10L 19/16*** | (2013.01) |
| ***H04L 9/30*** | (2006.01) |

(52) U.S. Cl.

CPC .............. *H04L 9/088* (2013.01); *G10L 19/02* (2013.01); *G10L 19/167* (2013.01); *H04L 9/30* (2013.01)

(58) Field of Classification Search

CPC ......... G10L 19/167; G10L 19/02; H04L 9/30; H04L 9/088

See application file for complete search history.

(56) References Cited

U.S. PATENT DOCUMENTS 6,426,780 B1 * 7/2002 Limberg .............. H04N 5/4446 375/348
6,757,913 B2 * 6/2004 Knox ..................... H04H 60/80 455/3.06
7,383,297 B1 * 6/2008 Atsmon ............ G06K 19/0723 709/200
7,659,843 B2 * 2/2010 Farley ..................... H03M 1/60 341/155
8,406,275 B2 * 3/2013 Sforza ..................... H04L 27/12 375/139
8,923,186 B1 * 12/2014 daCosta .................. H04W 4/70 370/312
9,529,071 B2 * 12/2016 Shibata ................... H04L 67/04
9,670,773 B2 * 6/2017 Croux ..................... E21B 47/16
9,860,077 B2 * 1/2018 Laurent .................. G05B 15/02
10,270,018 B2 * 4/2019 Jang ..................... H10H 20/841
10,397,287 B2 * 8/2019 Zhang ................... H04L 65/403
10,601,523 B1 * 3/2020 Abhishek ............... H04B 14/04

(Continued)

*Primary Examiner* — Mohammad A Siddiqi

(74) *Attorney, Agent, or Firm* — WOMBLE BOND DICKINSON (US) LLP

(57) ABSTRACT

Methods and systems for managing operation of endpoint devices are disclosed. The operation of the endpoint devices may be managed by requiring that the endpoint devices use a communication management framework to selective send communications via network and audio interfaces. Additionally, the communication management framework may cause the endpoint devices to update the manner in which audio communications are used over time to distribute data. The updates to the manner in which the audio communications are used over time may reduce the likelihood of a malicious entity from injecting malicious communications and/or snooping audio communications between endpoint devices.

20 Claims, 7 Drawing Sheets

(56) References Cited

U.S. PATENT DOCUMENTS

| | | | | |
|---|---|---|---|---|
| 2001/0052130 | A1* | 12/2001 | Yap | H04N 21/4312<br>386/E5.001 |
| 2002/0040475 | A1* | 4/2002 | Yap | H04N 21/47<br>725/39 |
| 2004/0208324 | A1* | 10/2004 | Cheung | H04M 1/03<br>381/79 |
| 2006/0122504 | A1* | 6/2006 | Gabara | H04B 11/00<br>600/437 |
| 2012/0095749 | A1* | 4/2012 | Capretta | H04H 20/63<br>704/8 |
| 2014/0050321 | A1* | 2/2014 | Albert | A61B 5/002<br>367/137 |
| 2014/0211779 | A1* | 7/2014 | Caire | H04W 56/0015<br>370/350 |
| 2017/0279571 | A1* | 9/2017 | Melodia | H04B 11/00 |
| 2018/0000344 | A1* | 1/2018 | Melodia | A61B 5/0026 |
| 2018/0027077 | A1* | 1/2018 | Melodia | G16H 40/67<br>370/254 |
| 2020/0359134 | A1* | 11/2020 | Tong | H04R 5/04 |
| 2022/0130369 | A1* | 4/2022 | Bohanan | H04R 17/00 |
| 2023/0129436 | A1* | 4/2023 | Park | H04L 1/0057<br>370/338 |

* cited by examiner

SECURE COMMUNICATION IN EDGE CLUSTERS USING AUDIO COMMUNICATIONS

FIELD

Embodiments disclosed herein relate generally to device management. More particularly, embodiments disclosed herein relate to systems and methods to secure devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
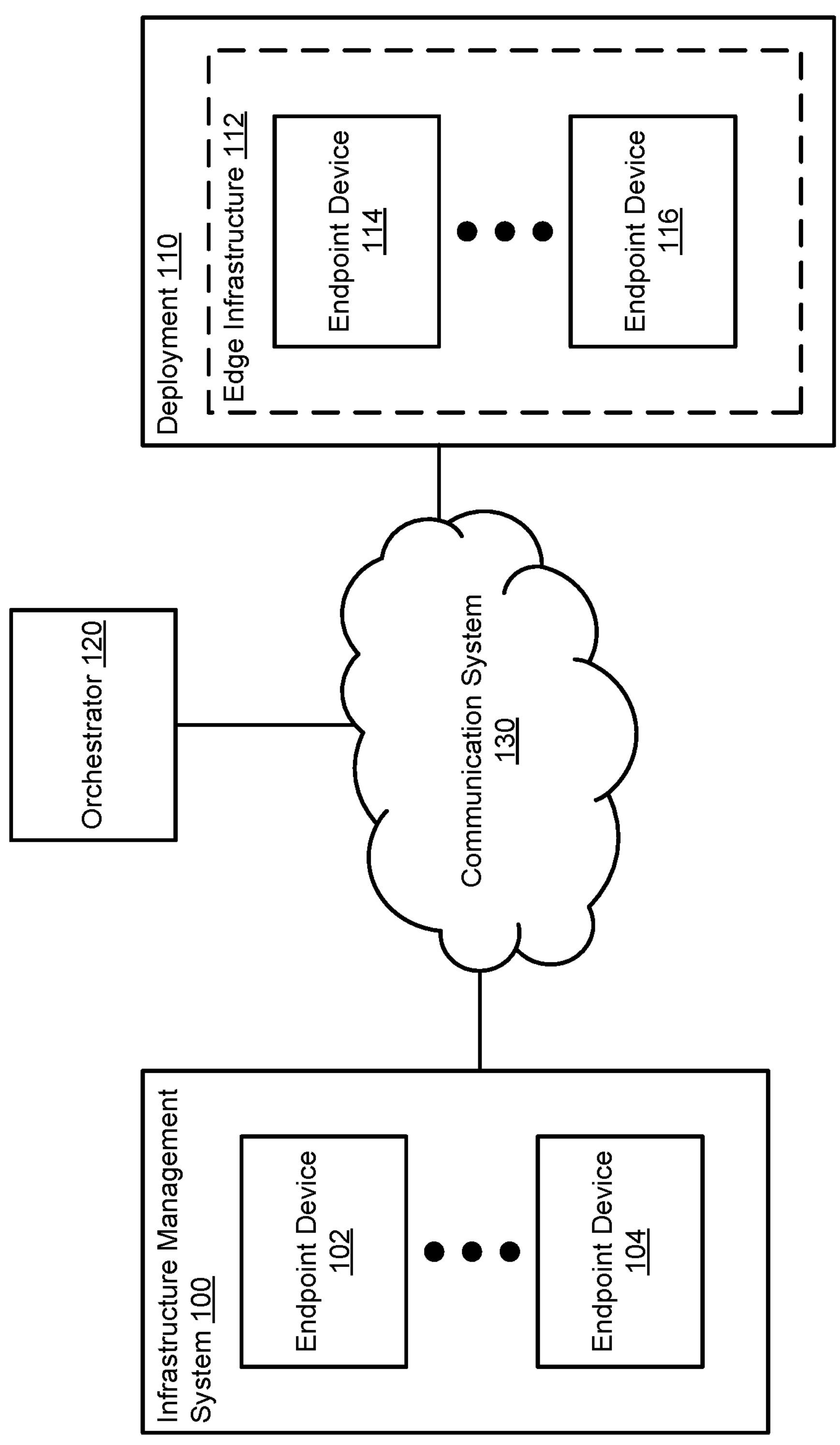
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing services using endpoint devices. To provide services using endpoint devices, the endpoint devices may host various pieces of software, may be configured in certain manners, and/or may be adapted to provide the computer implemented services in various ways.

During operation, the endpoint devices may transmit data to one another using various interfaces such as network and audio (e.g., ultrasonic communication) interfaces. For example, the ultrasonic interface may use audio carriers transmitted in free space. These audio carriers may be read by receiving devices and other devices in the area.

To manage use of the free space communication medium, the endpoint devices may utilize a frequency rotation scheme. The frequency rotation scheme may specify the frequency (e.g., frequency band) that each endpoint device is to use for audio communications during different periods of time. The frequency rotation scheme may, for example, that the frequency for communication used by each endpoint device is to change in accordance with a schedule (e.g., every 100 microseconds, every second, every 10 seconds, etc.), in accordance with occurrences of various conditions (e.g., completion of a data transmission, receiving a signal indicating a change is to be made), and/or based on other types of considerations. The changing frequency may reduce the likelihood that malicious entities are able to snoop the data transmitted via audio carriers in free space.

By doing so, even if audio carriers are intercepted by malicious devices and/or if malicious communications are transmitted to the endpoint devices, the likelihood of compromises occurring may be reduced by the use of the frequency rotation schemes. Because malicious entities are unlikely to know of the used scheme works, the malicious entities may be unlikely to utilizing the schemes in a manner that allows them to successfully interpret communications and/or spoof communications.

Thus, embodiments disclosed herein may address, among others, the technical problem of security in a distributed system. By implementing varying rotation and/or other types of management schemes, communications between endpoint devices of the distributed system via audio carriers may be less likely to be compromised.

In an embodiment, a method for managing communications between devices of a deployment is provided. The method may include obtaining, by a first device of the devices, data for transmission to a second device of the devices; encoding, by the first device, the data to obtain encoded data to reduce a quantity of the data to transit to the second device; encrypting, by the first device, the encoded data to obtain encrypted data; modulating, by the first device, the encrypted data onto an audio carrier wave to obtain a modulated audio carrier, the audio carrier wave being selected based on a carrier frequency rotation scheme; and transmitting, by the first device, the modulated audio carrier to provide the data to the second device.

The carrier frequency rotation scheme may associate each of the devices with corresponding audio carrier frequencies.

The carrier frequency rotation scheme may change the corresponding audio carrier frequencies over time.

The data may be encoded using a public key associated with the second device.

The encrypted data may be modulated onto the audio carrier wave based on a proximity of the first device to the second device.

The encrypted data may be modulated onto the audio carrier wave based on a type of the data.

The method may also include receiving, by the first device, a second modulated audio carrier from a second device, the second modulated audio carrier comprising a second audio carrier based on the carrier frequency rotation scheme; demodulating, by the first device, the second modulated audio carrier to obtain second encrypted data; decrypting, by the first device, the encrypted data using a private key associated with the first device to obtain encoded data; decoding, by the first device, the encoded data to obtain second data; and providing, by the first device, computer implemented services using the second data.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may initiate performance the computer-implemented method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include deployment 110. Deployment 110 may include edge infrastructure 112 which may include any number of endpoint devices (e.g., 114, 116). The endpoint devices may cooperatively and/or individually provide all, or a portion of the computer implemented services.

To contribute to the computer implemented services, the endpoint devices may host certain software, may be configured in certain manners (e.g., network communication configurations, software/hardware configurations, etc.), and/or may otherwise be modified to meet one or more requirements to contribute to the computer implemented services. Further, groups of endpoint devices may be modified to cooperatively provide various services. For example, some endpoint devices of a group may host some software to provide some functions while other endpoint devices of a group may host different software to provide other functions which, in aggregate, allow desired computer implemented services to be provided.

However, due to the placement of endpoint devices (e.g., at an edge installation) and the resources of the endpoint devices, the endpoint devices may be more susceptible to malicious activity. For example, any of the endpoint devices may be part of edge infrastructure (e.g., 112) which may subject the endpoint devices to physical attacks (e.g., malicious devices may be operably connected to the endpoint devices by attaching the malicious device to a port of a network interconnecting the endpoint devices), network attacks (e.g., networks that support operation of the edge installation may include fewer security mechanisms than would be present in other computing environments such as data centers), and/or the endpoint devices may be subject to more vectors of attack for other reason when compared to computing devices located in other computing environments.

Further, any of endpoint devices 114-116 may have limited network communications resources available to it. For example, any of the endpoint devices may be operably connected to other endpoint devices and/or other types of devices via limited communication channels (e.g., limited bandwidth, significant latency, etc.).

Additionally, some of endpoint devices 114-116 may have access to limited available power and/or limited resources for regulating the temperature of components of the endpoint devices. Thus, use of large amounts of power may impact the endpoint devices through lack of power and/or exceeding nominal operating temperatures (e.g., causing throttling and/or other undesired activity).

In general, embodiments disclosed herein may provide methods, systems, and/or devices for managing the operation of infrastructure. To manage the infrastructure, a communication management framework for edge devices (and/or other types of devices) of the infrastructure may be enforced. The communication management framework may require that certain types of data be preferentially sent over audio communication links (e.g., rather than network links) when such links are available.

For example, the communication management framework may require that general data transmissions between endpoint device be sent over audio links where the links are available. The audio links may be implemented using ultrasonic transmitters and receivers.

By doing so, embodiments disclosed herein may improve the security, energy efficiency, communications capabilities, and/or other characteristics of a distributed systems by preferentially using audio channels for data transmission when available. The system may do so by dynamically updating communication schemes used to govern the communications transmitted over the audio links. Thus, even if a malicious attacker is able to read free space audio communications, the malicious attacker may be less likely to successfully interpret the communications by virtue of the dynamically updated communication schemes utilized by the system.

To provide the above noted functionality, the system of FIG. 1A may include infrastructure management system 100, deployment 110, orchestrator 120, and communication system 130. Each of these components is discussed below.

Infrastructure management system 100 may facilitate management of deployment 110. Infrastructure management system 100 may include any number of endpoint devices (e.g., 102, 104). The endpoint devices may be used by administrators and/or other persons that manage deployment 110 to provide desired computer implemented services.

Orchestrator 120 may manage deployment 110. To manage deployment 110, orchestrator 120 may present interfaces to users of data processing systems 102-104 of infrastructure management system 100. The interfaces may allow privileged users (e.g., administrators, etc.) to enforce communication management frameworks by, for example, dynamically updating the communication schemes utilized to protect data transmitted via audio communication links.

Deployment 110, as noted above, may provide computer implemented services. To provide the computer implemented services, the endpoint devices of deployment 110 may implement the communication management framework discussed above.

The communication management framework may require that each endpoint device (i) preferentially utilize audio communication links when available, (ii) update the communication schemes used to protect the audio communication links over time, and/or (iii) utilize network links for communications when the audio communication links are unavailable. To facilitate communications between endpoint devices and other devices, each endpoint device may include audio and/or network communication interfaces. At least one communication interface may be a free space audio communication interface (e.g., audio broadcast interface).

Figure 1B:
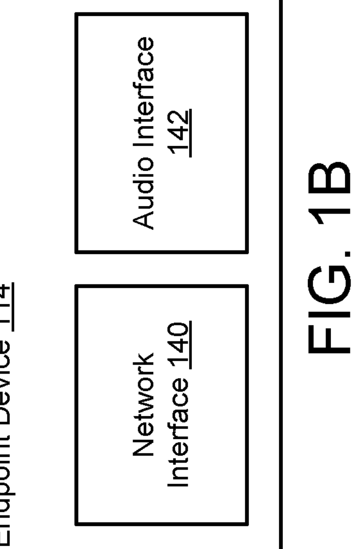
FIG. 1B shows a block diagram illustrating an endpoint device of a system in accordance with an embodiment.

Refer to FIG. 1B for additional details regarding free space audio communication interfaces.

When providing their functionality, any of (and/or components thereof) infrastructure management system 100, deployment 110, and/or orchestrator 120 may perform all, or a portion, of the actions and methods illustrated in FIGS. 2A-3B.

Any of (and/or components thereof) infrastructure management system 100, deployment 110, and orchestrator 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

As noted above, to facilitate communications with other devices, free space audio communications may be utilized. Turning to FIG. 1B, a diagram of endpoint device 114 in accordance with an embodiment is shown. Any of endpoint devices 114-116 may be similar to endpoint device 114.

As discussed above, endpoint device 114 may provide computer implemented services. To provide the computer implemented services, endpoint device 114 may communicate with other devices, such as other endpoint devices, orchestrators, etc.

To communicate with other devices, endpoint device 114 may include network interface 140 and audio interface 142. Network interface 140 may facilitate network communications with other devices (e.g., via communication system 130). Network interface 140 may be implemented with a network interface card or other devices that facilitates wired and/or wireless (e.g., using radio frequency and/or higher frequency bands up to 100 gigahertz) network communications.

Like network interface 140, audio interface 142 may also facilitate communications with other devices. However, audio interface 142 may utilize audio transmission mediums (e.g., free space) and audio signals (e.g., ultrasonic wave) to exchange information with other devices. Audio interface 142 may include an audio transceiver or other type of system for generating audio signals and interpreting received audio signals. For example, the audio transceiver may generate modulated audio signals to carry data, and may facilitate interpretation of received audio signals to receive data.

In an embodiment, the audio transceiver includes functionality to generate audio signals of varying frequency. For example, the audio transceiver may generate audio carriers of configurable frequency, and module data onto the audio carriers. Likewise, to receive data, the audio transceiver may be tuned to a particular carrier frequency to receive a modulated audio carrier. Once received, the modulated audio carrier may be demodulated to obtain data modulated on to the audio carrier.

Figure 2A:
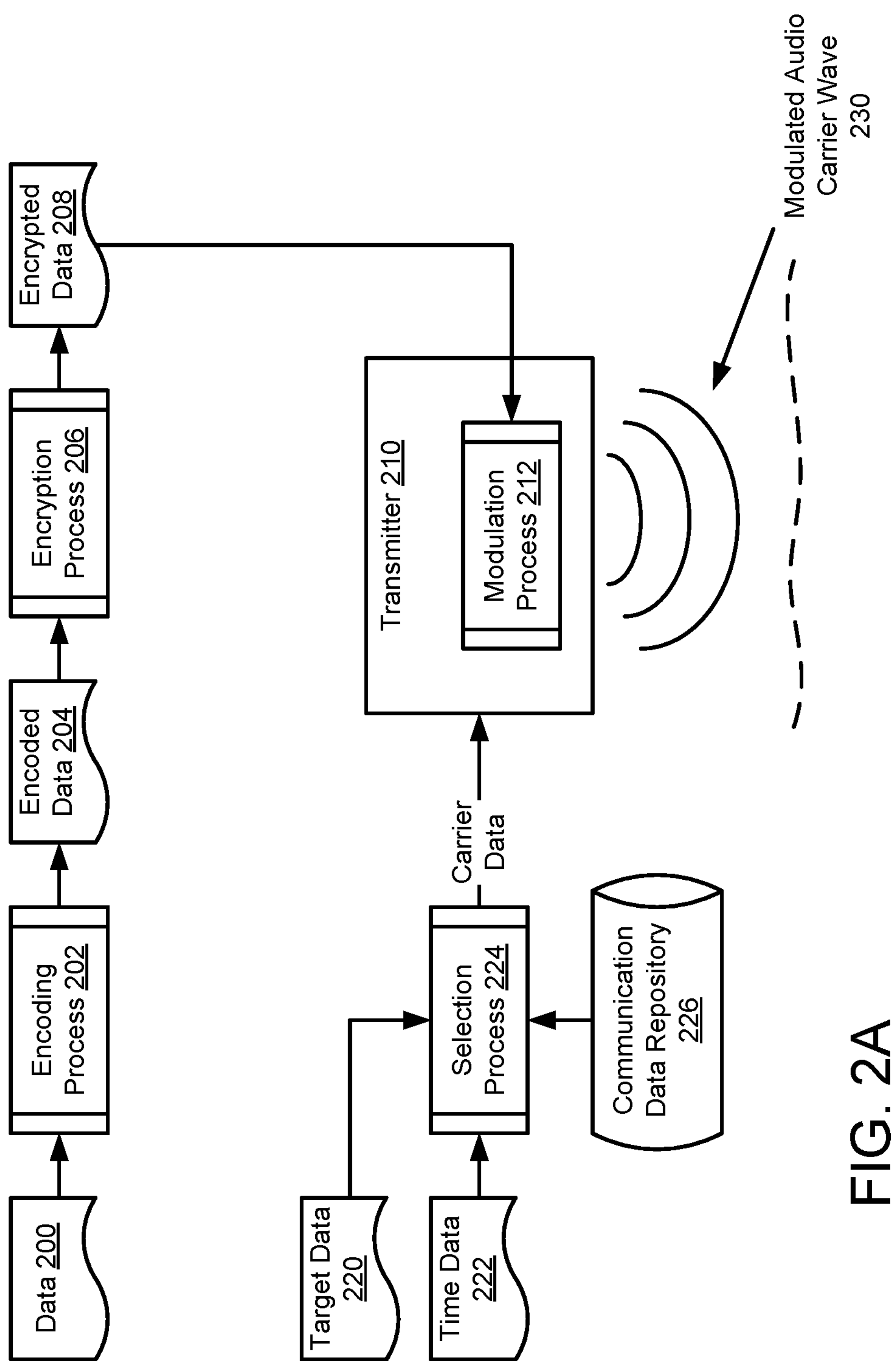
FIGS. 2A-2B show data flow diagrams in accordance with an embodiment.

To reduce the likelihood of the data transmitted via the audio carrier being compromised, the communication management framework may require that different carriers be used over time. Thus, over time different carrier frequencies may be used to transmit data. Refer to FIG. 2A for additional details regarding audio carriers. By doing so, embodiments disclosed herein may improve the security of communications across a distributed system, may reduce power consumption for transmission of the communications, may improve the available communication bandwidth for sending/receiving data, and/or may provide other benefits.

Figure 2B:
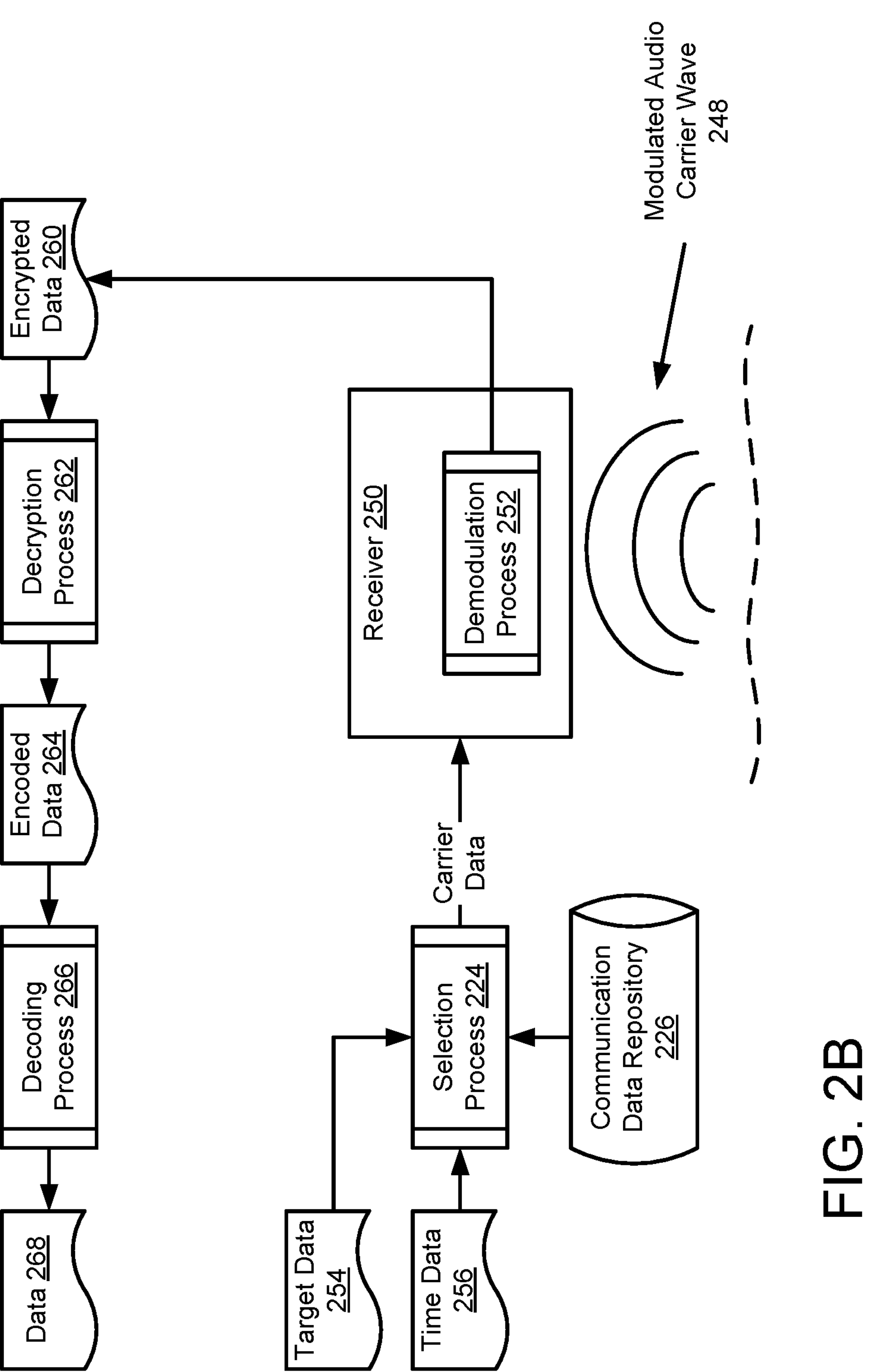

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 204, etc.) is used to represent data structures, a second set of shapes (e.g., 202, 206, etc.) is used to represent processes performed using and/or that generate data, a third set of shapes (e.g., 226, etc.) is used to represent large scale data structures such as databases, and a fourth set of shapes (e.g., 210, 250, etc.) is used to represent special purpose hardware components.

Turning to FIG. 2A, a first data flow diagram in accordance with an embodiment is shown. The first data flow diagram may illustrate data used in and data processing performed in transmitting of data to a device.

To transmit data 200 to another device, the data may be subjected to a processing pipeline which may encode, encrypt, and modulate the data onto an audio carrier for transmission to the other device. Data 200 may include any type and quantity of data, and may be obtained via any process (e.g., an application of an endpoint device may generate the data, and the application may indicate that it is to be transmitted to the device).

Once data 200 obtained, data 200 may be ingested by encoding process 202. During encoding process 202, data 200 may be encoded to obtain encoded data 204. The encoding process may be any type of encoding technique such as, for example, deduplication, compression, addition of integrity data, and/or other types of encoding processes. For example, compressing the data may reduce the size of the data thereby reducing the total quantity of data necessary to be transmitted to another device for the other device to have access to the data (e.g., by decoding).

Encoded data 204 may be ingested by encryption process 206. During encryption process 206, encoded data 204 may be encrypted to obtain encrypted data 208. Encryption process 206 may utilize any encryption algorithm, and may use a public key corresponding to the target device (e.g., identified by target data 220) to encrypt encoded data 204.

Once encrypted, encrypted data 208 may be modulated onto an audio carrier to obtain modulated audio carrier wave 230. To modulate encrypted data 208 onto the audio carrier, modulation process 212 may be performed by transmitter 210 (e.g., part of an audio transceiver, may include capability to generate audio carriers and modulate/demodulate data onto/from audio carriers, the audio carriers may be ultrasonic frequencies such as 20, 30, 40, etc. kilohertz).

During module process 212, the audio carrier may be modified based on encrypted data. Any type of modulation (e.g., amplitude, shift keying, etc.) of audio carrier may be performed to modulate the audio carrier to carry encrypted data 208.

To generate audio carrier, an audio carrier frequency may be selected. To select the audio frequency for the audio carrier, target data 220 and time data 222 may be obtained. Target data 220 may indicate the device to which data 200 is to be transmitted. Time data 222 may be when data 200 is being sent. These portions of data may be ingested by selection process 224.

During selection process 224, a frequency for the audio carrier on which encrypted data 208 is to be modulated may be selected. To do so, a lookup in communication data repository 226 may be performed using the aforementioned portions of data as keys.

Communication data repository 226 may associate different frequencies (e.g., 20 kilohertz, 30 kilohertz, etc.) with different combinations of keys. For example, each device of a distributed system may be given a unique seed. The unique seed may be used in combination with a frequency selection algorithm to identify corresponding frequencies for the device over time. For example, the frequency selection algorithm may specify different frequencies over different periods of time. The seed for each device may define which frequency is associated with each period of time for the device. Generally, each device that is likely to be within proximity of another device such that audio communications are likely to be exchangeable between the devices may be assigned a unique frequency during each period of time. Consequently, no two devices that are likely to be within range to exchange audio communications with each other are assigned a same seed (e.g., so that during each time period the frequency ascribed to the device by the frequency selection algorithm is unique to the device). Any frequency selection algorithm may be used, but the assignments of frequencies to devices via the selection algorithm may be substantially random (e.g., so that malicious entities are unlikely to be able to predict future frequency assignments by the selection algorithm).

Once selected, carrier data (e.g., the frequency for the audio carrier) may be provided to transmitter 210. Transmitter 210 may use the data to generate an audio carrier (e.g., by setting an ultrasonic frequency generation frequency of the audio transmitter).

Once obtained, modulated audio carrier wave 230 may be transmitted (e.g., broadcast) so that the target device is able to receive it and retrieve data 200.

Turning to FIG. 2B, a second data flow diagram in accordance with an embodiment is shown. The second data flow diagram may illustrate data used in and data processing performed in receiving of data from another device.

To receive data, modulated audio carrier wave 248 may be received by receiver 250. To receive the modulated audio carrier wave 248, a frequency for the audio carrier may be identified similarly to as described with respect to FIG. 2A. For example, target data 254 for the sending and time data 256 for the current time may be used to perform a lookup to identify the carrier frequency. Once identified, receiver 250 (e.g., an audio receiver) may be tuned to the audio carrier frequency to receive modulated audio carrier wave 248.

After modulated audio carrier wave 248 is obtained, demodulation process 252 may be performed. During demodulation process 252, modulated audio carrier wave 248 may be demodulated to obtain encrypted data 260.

Encrypted data 260 may be decrypted via decryption process 262. During decryption process 262, a private key maintained by the receiving endpoint device may be used to decrypt encrypted data 260 to obtain encoded data 264.

Encoded data 264 may then be ingested by decoding process 266 to obtain data 268. During decoding process 266, a complementary process to encoding process 202 may be performed to remove the effects of encoding of data 268. Data 268 may be recovered via the flow shown in FIG. 2B.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
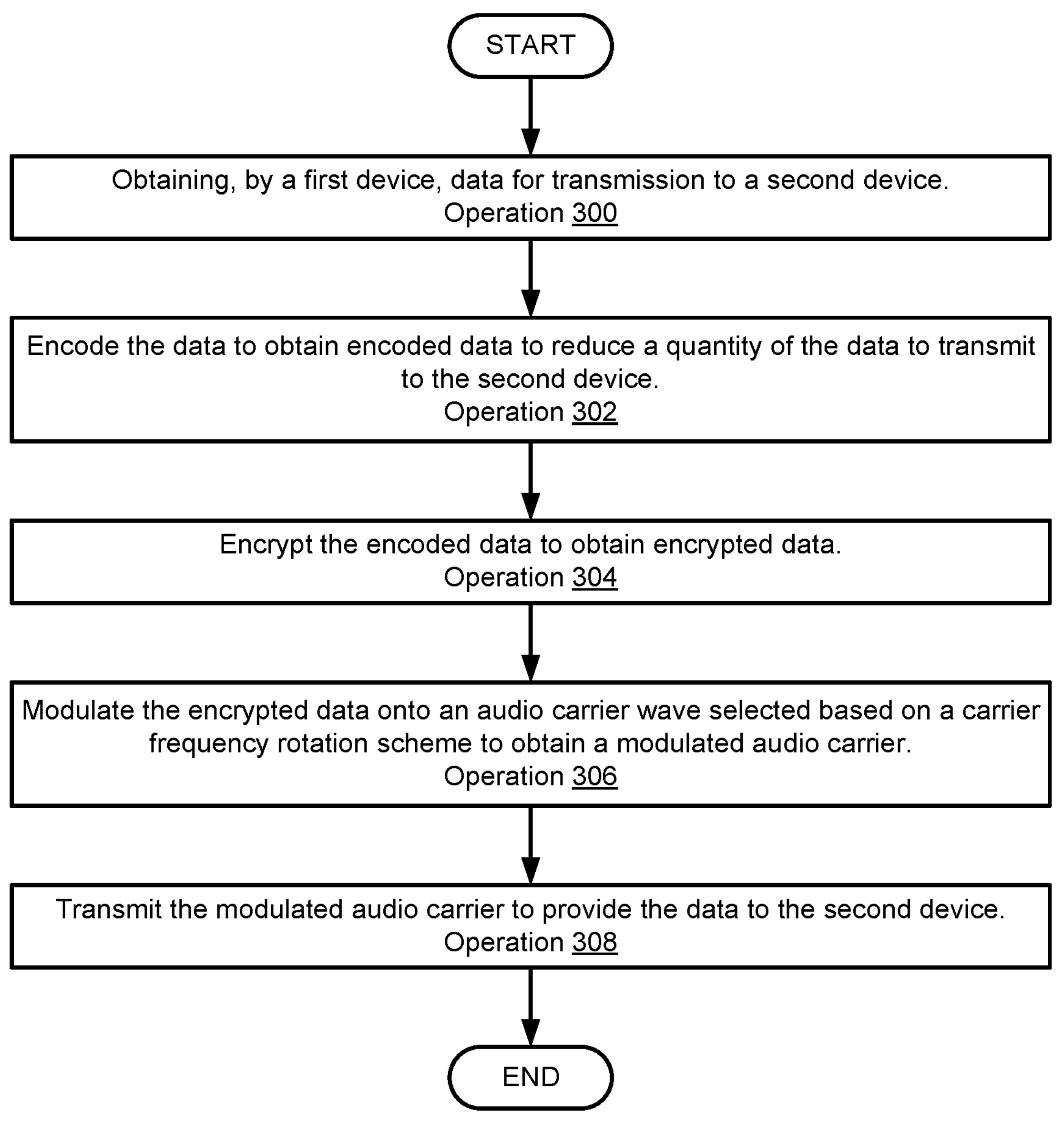
FIGS. 3A-3B show flow diagrams illustrating methods in accordance with an embodiment.
Figure 3B:
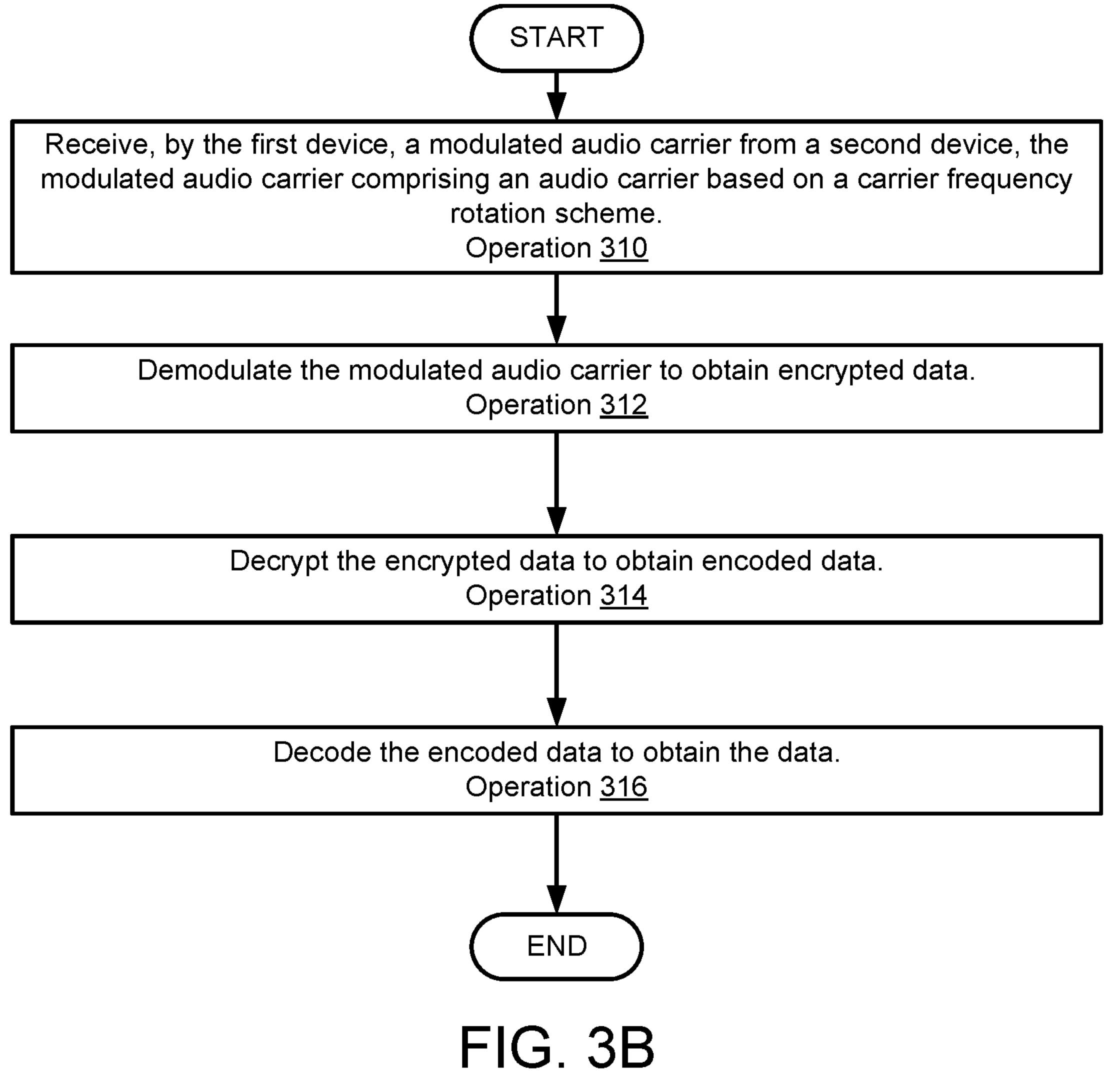

As discussed above, the components of FIG. 1A may perform various methods to manage communications between endpoint devices. FIGS. 3A-3B illustrate methods that may be performed by the components of the system of FIG. 1A. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method for managing communications in accordance with an embodiment is shown. The method may be performed, for example, by any of infrastructure management system 100, deployment 110, orchestrator 120, and/or other components of the system shown in FIGS. 1A-2B.

At operation 300, data for transmission to a second device is obtained by a first device. The data may be obtained by reading the data from storage, obtaining the data from another device, by generating the data (e.g., by operation of an application), and/or via other methods. Any amount of data may be obtained, and the data may include any type of content.

The first device and the second device may be members of a computer environment such as a data center, an edge installation, and/or other type of environment. Each of the devices may include ultrasonic transceivers and network components such as network interface cards. Data may be exchanged with other devices via any of these mechanisms.

The first device may elect to communicate the data to the second device via one of these communication interfaces. For example, if both devices are within a predetermined range of one another such that the ultrasonic transceivers are able to transmit and receive data between the two devices, then the first device may preferentially elect to communicate with the second device via an audio free space communication channel supported by the ultrasonic transceivers.

In another example, the first device may make the determination based on the data itself. For example, various policies may define the communication interface to use for different types of data. Thus, the type of the data may determine whether to distribute the data via the audio or network interface.

For the purposes of the example flow shown in FIGS. 3A-3B, communication with respect to the audio interface is shown. However, it will be appreciated that other interfaces may be used for all or portions of the data based on the type of the data and/or other factors on which the policies may operate.

At operation 302, the data is encoded to obtain encoded data. The encoded data may reduce a quantity of the data to transmit to the second device (e.g., when compared to transmitting the non-encoded data), may improve the likelihood of successful transmission (e.g., parity bit encoding), and/or may provide other benefits over the non-encoded data. The data may be encoded by applying an encoding algorithm to the data. The encoding algorithm may generate the encoded data. The encoding algorithm may be, for example, compression, parity data generation, deduplication, etc.

At operation 304, the encoded data is encrypted to obtain encrypted data. The data may be encrypted by applying an encryption algorithm to the data using a public key or other type of secret. The encryption algorithm may be symmetric (advanced encryption standard (AES), triple data encryption standard (TDES), etc.), asymmetric (e.g., Diffie-Hellman, elliptical curve cryptography (ECC), Rivest-Shamir-Adleman (RSA), etc.), and/or other types of encryption algorithms.

At operation 306, the encrypted data is modulated onto an audio carrier wave selected based on a carrier frequency rotation scheme to obtain a modulated audio carrier. The encrypted data may be modulated by (i) identifying the audio carrier wave to be used, (ii) generating the audio carrier, and (iii) modulating the audio carrier wave based on the encrypted data. The audio carrier wave may be identified by (i) performing a lookup in a data structure that associates different points in time and/or senders/receivers of the data with corresponding audio carrier wave frequencies to identify a frequency for the audio carrier wave, and/or (ii) using an algorithm for the carrier frequency rotation scheme to identify the frequency for the audio carrier wave.

The audio carrier may be generated, for example, by tuning a frequency oscillator to the identified frequency for the audio carrier wave. The tuned frequency oscillator may generate the audio carrier wave with the prescribed frequency content.

The audio carrier may be modulated by feeding the audio carrier and the encrypted data to a modulator. The modulator may be implemented using a discrete circuit or may be a digital modulator. The modulator may provide (i) amplitude modulation (the amplitude of the audio carrier wave is varied based on the encrypted data), (ii) frequency modulation (the frequency of the audio carrier wave is varied based on the encrypted data), (iii) phase modulation (the phase shift of the audio carrier wave is varied based on the encrypted data), (iv) quadrature modulation (e.g., combination of amplitude and frequency/phase modulation), and/or other types of modulation techniques to enable the encrypted data to be retrieved from the modulated audio carrier wave via demodulation.

At operation 308, the modulated audio carrier is transmitted to provide the data to the second device. The modulated audio carrier may be transmitted by broadcasting it via a transmitter (e.g., which may include a speaker) of the audio transceiver of the first device. The method may end following operation 308.

Thus, using the method shown in FIG. 3A, the data may be transmitted via audio free space transmission.

Turning to FIG. 3B, a second flow diagram illustrating a method for participating in communications in accordance with an embodiment is shown. The method may be performed, for example, by any of infrastructure management system 100, deployment 110, orchestrator 120, and/or other components of the system shown in FIGS. 1A-2B.

At operation 310, a modulated audio carrier from a second device may be received by a first device. The modulated audio carrier may include an audio carrier that is based on a carrier frequency rotation scheme. The modulated audio carrier may be received by (i) identifying a frequency of the audio carrier based on the carrier frequency rotation scheme, (ii) tuning a transceiver to the identified frequency, and (iii) listening for the modulated audio carrier using the tuned transceiver. The audio carrier wave may be identified by (i) performing a lookup in a data structure that associates different points in time and/or senders/receivers of the data with corresponding audio carrier wave frequencies to identify a frequency for the audio carrier wave, and/or (ii) using an algorithm for the carrier frequency rotation scheme to identify the frequency for the audio carrier wave.

The transceiver may be tuned by updating the operation of a modulator based on the frequency of the audio carrier. For example, an input filter may be tuned to match the frequency (e.g., may be a band-pass filter), an oscillator used by the modulator to upconvert and/or down convert, and/or otherwise update operation of the modulator to facilitate reception of the modulated audio carrier.

At operation 312, the modulated audio carrier is demodulated to obtain encrypted data. The modulated audio carrier may be demodulated by feeding the modulated audio carrier and another signal (e.g., an intermediate frequency used for up/down conversion) to the modulated which may demodulate the modulated audio carrier wave to retrieve the encrypted data from it.

At operation 314, the encrypted data is decrypted to obtain encoded data. The encrypted data may be decrypted using a complementary decryption algorithm (e.g., refer to the description of operation 304 for addition details regarding encryption, the decryption may be a same algorithm but used for decryption).

At operation 316, the encoded data is decoded to obtain data. The encoded data may be decrypted using a complementary decoding algorithm (e.g., refer to the description of operation 302 for addition details regarding encoding, the decoding may be performed using a same algorithm but used for decoding rather than encoding).

The method may end following operation 316.

Once obtained, the data may be used to provide desired computer implemented services, may be used to manage the operation of the first device (e.g., the first device may update its operation based on the data by, for example, modifying a hardware/software component setting, installing/uninstalling software components, disabling/enabling hardware components, initiating performance of new workloads and/or terminating performance of existing workloads, initiating and/or terminating communications with other devices, etc.), and/or may be used for other purposes.

Figure 4:
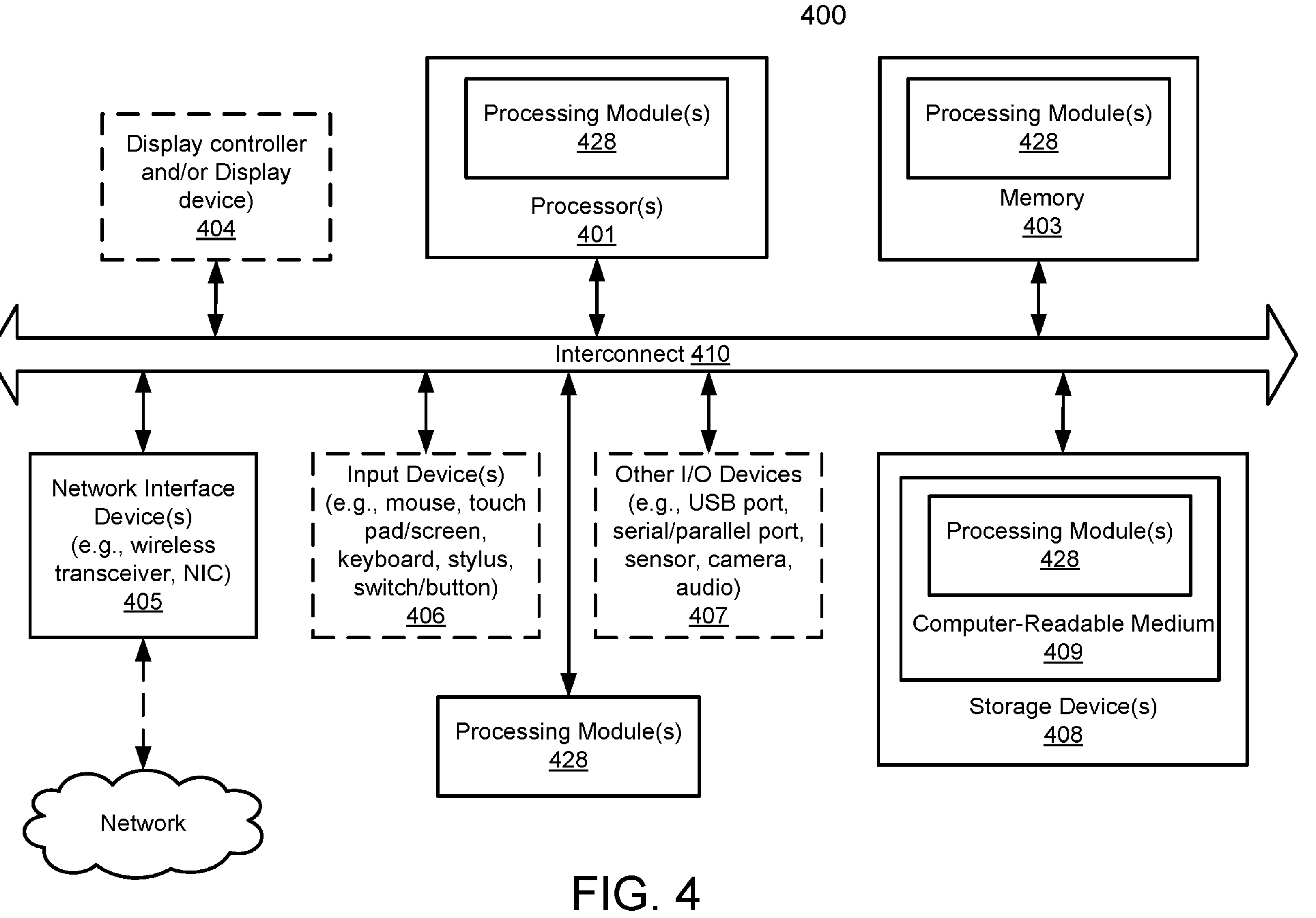
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing communications between devices of a deployment, the method comprising:

obtaining, by a first device of the devices, data for transmission to a second device of the devices, the data comprising configuration data of the first device;

performing, by the first device, a security mechanism to transmit the data for transmission to the second device across a free space that separates the devices from one another in a secured manner by at least:

encoding, by the first device, the data to obtain encoded data to reduce a quantity of the data to transit to the second device;

encrypting, by the first device, the encoded data to obtain encrypted data;

modulating, by the first device, the encrypted data onto an audio carrier wave to obtain a modulated audio carrier, the audio carrier wave being selected based on a carrier frequency rotation scheme and the audio carrier wave being ultrasonic waves configured for transmission within the free space, wherein the security mechanism prevents the data for transmission to the second device from being snooped as the data for the transmission to the second device travels through the free space from the first device to the second device; and transmitting, by the first device, the modulated audio carrier to provide the data to the second device.

2. The method of claim 1, wherein the carrier frequency rotation scheme associates each of the devices with corresponding audio carrier frequencies.

3. The method of claim 2, wherein the carrier frequency rotation scheme changes the corresponding audio carrier frequencies over time.

4. The method of claim 1, wherein the data is encoded using a public key associated with the second device.

5. The method of claim 1, wherein the encrypted data is modulated onto the audio carrier wave based on a proximity of the first device to the second device.

6. The method of claim 1, wherein the encrypted data is modulated onto the audio carrier wave based on a type of the data.

7. The method of claim 1, further comprising:

receiving, by the first device, a second modulated audio carrier from a second device, the second modulated audio carrier comprising a second audio carrier based on the carrier frequency rotation scheme;

demodulating, by the first device, the second modulated audio carrier to obtain second encrypted data;

decrypting, by the first device, the encrypted data using a private key associated with the first device to obtain encoded data;

decoding, by the first device, the encoded data to obtain second data; and providing, by the first device, computer implemented services using the second data.

8. The method of claim 1, wherein the data for transmission does not contain actual audio data.

9. The method of claim 1, wherein the configuration data of the first device comprises configurations of one or more software installed on the first device, and the data for transmission to the second device further comprises one or more instructions generated by the first device that are to be executed by the second device.

10. The method of claim 9, wherein the configurations of the one or more software installed on the first device and the one or more instructions are attached onto the audio carrier wave as part of the modulating.

11. A non-transitory machine-readable medium having instructions stored therein, which when executed by a processor, cause the processor to perform operations for managing communications between devices of a deployment, the operations comprising:

obtaining, by a first device of the devices, data for transmission to a second device of the devices, the data comprising configuration data of the first device;

performing, by the first device, a security mechanism to transmit the data for transmission to the second device across a free space that separates the devices from one another in a secured manner by at least:

encoding, by the first device, the data to obtain encoded data to reduce a quantity of the data to transit to the second device;

encrypting, by the first device, the encoded data to obtain encrypted data;

modulating, by the first device, the encrypted data onto an audio carrier wave to obtain a modulated audio carrier, the audio carrier wave being selected based on a carrier frequency rotation scheme and the audio carrier wave being ultrasonic waves configured for transmission within the free space, wherein the security mechanism prevents the data for transmission to the second device from being snooped as the data for the transmission to the second device travels through the free space from the first device to the second device; and transmitting, by the first device, the modulated audio carrier to provide the data to the second device.

12. The non-transitory machine-readable medium of claim 11, wherein the carrier frequency rotation scheme associates each of the devices with corresponding audio carrier frequencies.

13. The non-transitory machine-readable medium of claim 12, wherein the carrier frequency rotation scheme changes the corresponding audio carrier frequencies over time.

14. The non-transitory machine-readable medium of claim 11, wherein the data is encoded using a public key associated with the second device.

15. The non-transitory machine-readable medium of claim 11, wherein the encrypted data is modulated onto the audio carrier wave based on a proximity of the first device to the second device.

16. The non-transitory machine-readable medium of claim 11, wherein the encrypted data is modulated onto the audio carrier wave based on a type of the data.

17. The non-transitory machine-readable medium of claim 11, wherein the operations further comprise:

receiving, by the first device, a second modulated audio carrier from a second device, the second modulated audio carrier comprising a second audio carrier based on the carrier frequency rotation scheme;

demodulating, by the first device, the second modulated audio carrier to obtain second encrypted data;

decrypting, by the first device, the encrypted data using a private key associated with the first device to obtain encoded data;

decoding, by the first device, the encoded data to obtain second data; and providing, by the first device, computer implemented services using the second data.

18. A first device, comprising:

a processor; and a memory coupled to the processor to store instructions, which when executed by the processor, cause the processor to perform operations for managing communications between devices of a deployment, the operations comprising:

obtaining, by the first device, data for transmission to a second device of the devices, the data comprising configuration data of the first device;

performing, by the first device, a security mechanism to transmit the data for transmission to the second device across a free space that separates the devices from one another in a secured manner by at least:

encoding, by the first device, the data to obtain encoded data to reduce a quantity of the data to transit to the second device;

encrypting, by the first device, the encoded data to obtain encrypted data;

modulating, by the first device, the encrypted data onto an audio carrier wave to obtain a modulated audio carrier, the audio carrier wave being selected based on a carrier frequency rotation scheme and the audio carrier wave being ultrasonic waves configured for transmission within the free space, wherein the security mechanism prevents the data for transmission to the second device from being snooped as the data for the transmission to the second device travels through the free space from the first device to the second device; and transmitting, by the first device, the modulated audio carrier to provide the data to the second device.

19. The first device of claim 18, wherein the carrier frequency rotation scheme associates each of the devices with corresponding audio carrier frequencies.

20. The first device of claim 19, wherein the carrier frequency rotation scheme changes the corresponding audio carrier frequencies over time.

* * * * *